(12) United States Patent
Fujita et al.

(10) Patent No.: US 9,315,915 B2
(45) Date of Patent: Apr. 19, 2016

(54) METHOD FOR MANUFACTURING ZIRCONIUM METAL AND HAFNIUM METAL

(75) Inventors: Reiko Fujita, Nerima-Ku (JP); Koji Mizuguchi, Kawasaki (JP); Hitoshi Nakamura, Yokohama (JP); Kouki Fuse, Ota-Ku (JP); Mitsuru Kawamoto, Tokorozawa (JP); Masaru Ito, Fujisawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1254 days.

(21) Appl. No.: 13/001,870

(22) PCT Filed: Jun. 29, 2009

(86) PCT No.: PCT/JP2009/061879
§ 371 (c)(1),
(2), (4) Date: Dec. 29, 2010

(87) PCT Pub. No.: WO2010/001866
PCT Pub. Date: Jan. 7, 2010

(65) Prior Publication Data
US 2011/0108434 A1   May 12, 2011

(30) Foreign Application Priority Data

Jun. 30, 2008 (JP) ................................ 2008-171837

(51) Int. Cl.
*C25C 3/00* (2006.01)
*C22B 5/00* (2006.01)
(Continued)

(52) U.S. Cl.
CPC . *C25C 3/26* (2013.01); *C22B 34/14* (2013.01); *C22B 34/129* (2013.01); *C22B 34/1222* (2013.01); *Y02P 10/23* (2015.11)

(58) Field of Classification Search
CPC ..................................... C25C 3/00; C22B 5/00
USPC ................................... 205/397, 366
See application file for complete search history.

(56) References Cited

U.S. PATENT DOCUMENTS

| 4,923,577 A | 5/1990 | McLaughlin et al. |
| 5,112,493 A | 5/1992 | Snyder et al. |

(Continued)

FOREIGN PATENT DOCUMENTS

| JP | 2 111893 | 4/1990 |
| JP | 5 33072 | 2/1993 |

(Continued)

OTHER PUBLICATIONS

International Preliminary Report on Patentability and Written Opinion issued Feb. 8, 2011, in PCT/JP2009/061879 filed Jun. 29, 2009.

(Continued)

*Primary Examiner* — Zulmariam Mendez
(74) *Attorney, Agent, or Firm* — Oblon, McClelland, Maier & Neustadt, L.L.P.

(57) ABSTRACT

An object of the present invention is to provide a method of producing metal zirconium, the method having a fewer steps and a smaller amount of secondary wastes generated, wherein the metal zirconium is obtained from a zirconium compound containing hafnium. A method of producing metal zirconium according to the present invention includes: a separation step of separating a hafnium oxychloride from a first substance containing a zirconium oxychloride and a hafnium oxychloride to obtain a second substance having a higher content of the zirconium oxychloride; a calcination step of calcining the second substance to obtain a third substance containing at least any of a zirconium oxychloride and a zirconium oxide; and a direct reduction step of holding the third substance in a molten salt with the third substance brought into contact with a cathode and applying a voltage between the cathode and an anode to directly reduce the third substance to obtain metal zirconium.

12 Claims, 8 Drawing Sheets

(51) Int. Cl.
  *C25C 3/26* (2006.01)
  *C22B 34/14* (2006.01)
  *C22B 34/12* (2006.01)

(56) References Cited

U.S. PATENT DOCUMENTS

| | | | |
|---|---|---|---|
| 5,762,890 | A | 6/1998 | Byers et al. |
| 6,737,030 | B2 * | 5/2004 | Sommers et al. ............... 423/70 |
| 6,929,786 | B2 | 8/2005 | Delons et al. |
| 7,344,693 | B2 * | 3/2008 | Uchida et al. ................ 423/608 |
| 2006/0137992 | A1 | 6/2006 | Lewin et al. |
| 2008/0031791 | A1 * | 2/2008 | Delons et al. .................. 423/73 |

FOREIGN PATENT DOCUMENTS

| | | |
|---|---|---|
| JP | 2002 517613 | 6/2002 |
| JP | 2006 509104 | 3/2006 |

OTHER PUBLICATIONS

International Search Report issued Oct. 6, 2009 in PCT/JP09/061879 filed Jun. 29, 2009.

Office Action issued Oct. 16, 2013 in Kazakhstan Patent Application No. 2011/1505.1 (with English language translation).

* cited by examiner ically reducing or by electrolytic refining, in a molten salt, a substance containing at least one of a zirconium oxychloride and a zirconium oxide generated in an intermediate step.

METHOD FOR MANUFACTURING ZIRCONIUM METAL AND HAFNIUM METAL

TECHNICAL FIELD

The present invention relates to a method of producing metal zirconium from a substance containing a zirconium oxychloride and a hafnium oxychloride, and in particular to a method of producing metal zirconium by directly reducing or by electrolytic refining, in a molten salt, a substance containing at least one of a zirconium oxychloride and a zirconium oxide generated in an intermediate step.

BACKGROUND ART

Metal zirconium that is a material of a zircaloy alloy used in a cladding tube or a channel box (CB) for an atomic fuel is produced by removing impurities such as homologous element hafnium or the like from zirconium oxide called zircon sand.

As a method of producing metal zirconium, a chlorination-volatilization method where zirconium oxide containing hafnium is converted to chlorides and hafnium is separated from zirconium by vapor pressure difference between the chlorides is disclosed in U.S. Pat. No. 6,929,786 (Patent Document 1).

Furthermore, as a method of producing metal zirconium, a method where zirconium oxide is once converted to an oxychloride, followed by dissolving in hydrochloric acid, further followed by conducting solvent extraction to separate hafnium from zirconium is disclosed in U.S. Pat. No. 5,762,890 (Patent Document 2).

In Patent Document 2 described above, as a method of producing metal zirconium from a purified zirconium oxychloride from which hafnium has been separated, a method where a zirconium oxychloride is once converted to a zirconium oxide, followed by converting to a chloride, and a Kroll process is used to produce metal zirconium is disclosed.

Patent Document 1: U.S. Pat. No. 6,929,786
Patent Document 2: U.S. Pat. No. 5,762,890

DISCLOSURE OF THE INVENTION

However, according to the chlorination-volatilization method disclosed in Patent Document 1, chlorides such as ammonium chloride and the like are generated as by-products and the chlorides become secondary wastes; accordingly, a problem is that the amount of secondary wastes generated is much.

Furthermore, in the case where the Kroll process disclosed in Patent Document 2 is used, a problem is that not only the number of steps is large but also the amount of secondary wastes generated is much.

That is, when the Kroll process is used, a zirconium oxychloride purified after hafnium has been separated is once converted to zirconium oxide, followed by converting to a zirconium chloride by carbothermal reduction in a first reduction step, further followed by reducing by the Kroll process that uses magnesium for the zirconium chloride in a second reduction step to obtain metal zirconium; accordingly, two reduction steps are necessary.

In the second reduction step, chlorides such as magnesium chloride or the like that become secondary wastes are generated as by-products. Furthermore, in a step that is conducted before the first reduction step and converts a zirconium oxychloride to a zirconium oxide, ammonium chloride that becomes secondary waste is generated as a by-product.

Accordingly, in the case where the Kroll process as disclosed in Patent Document 2 is used, an oxychloride is converted to an oxide, followed by reducing to metal, whereby the number of steps increases; accordingly, a problem is that production cost is high and the amount of secondary wastes generated is much.

The present invention has been conducted in view of the aforementioned situation and an object thereof is to provide a method of producing metal zirconium, the method having a fewer steps and a smaller amount of secondary wastes generated, wherein the metal zirconium is obtained from a zirconium compound containing hafnium.

A method of producing metal zirconium according to the present invention solves the foregoing problems and includes: a separation step of separating a hafnium oxychloride from a first substance containing a zirconium oxychloride and a hafnium oxychloride to obtain a second substance having a higher content of the zirconium oxychloride; a calcination step of calcining the second substance to obtain a third substance containing at least one of a zirconium oxychloride and a zirconium oxide; and a direct reduction step of holding the third substance in a molten salt with the third substance brought into contact with a cathode and applying a voltage between the cathode and an anode to directly reduce the third substance to obtain metal zirconium.

Furthermore, a method of producing metal zirconium according to the present invention solves the foregoing problems and includes: a separation step of separating a hafnium oxychloride from a first substance containing a zirconium oxychloride and a hafnium oxychloride to obtain a second substance having a higher content of the zirconium oxychloride; a hydroxide precipitation step of adding a hydroxide to the second substance to obtain a fourth substance containing zirconium hydroxide; a calcination step of calcining the fourth substance to obtain a fifth substance containing zirconium oxide; and a direct reduction step of holding the fifth substance in a molten salt with the fifth substance brought into contact with a cathode and applying a voltage between the cathode and an anode to directly reduce the fifth substance to obtain metal zirconium.

Still furthermore, a method of producing metal zirconium according to the present invention solves the foregoing problems and includes: a separation step of separating a hafnium oxychloride from a first substance containing a zirconium oxychloride and a hafnium oxychloride to obtain a second substance having a higher content of the zirconium oxychloride; a calcination step of calcining the second substance to obtain a third substance containing at least any of a zirconium oxychloride and a zirconium oxide; and an electrolytic refining step of dissolving the third substance in a molten salt and applying a voltage between a cathode and an anode immersed in a molten salt to conduct electrolytic refining to obtain metal zirconium.

According to the method of producing metal zirconium according to the present invention, metal zirconium can be produced from a zirconium compound containing hafnium by a method having a fewer steps and a smaller amount of secondary wastes generated.

DESCRIPTION OF SYMBOLS

Figure 1:
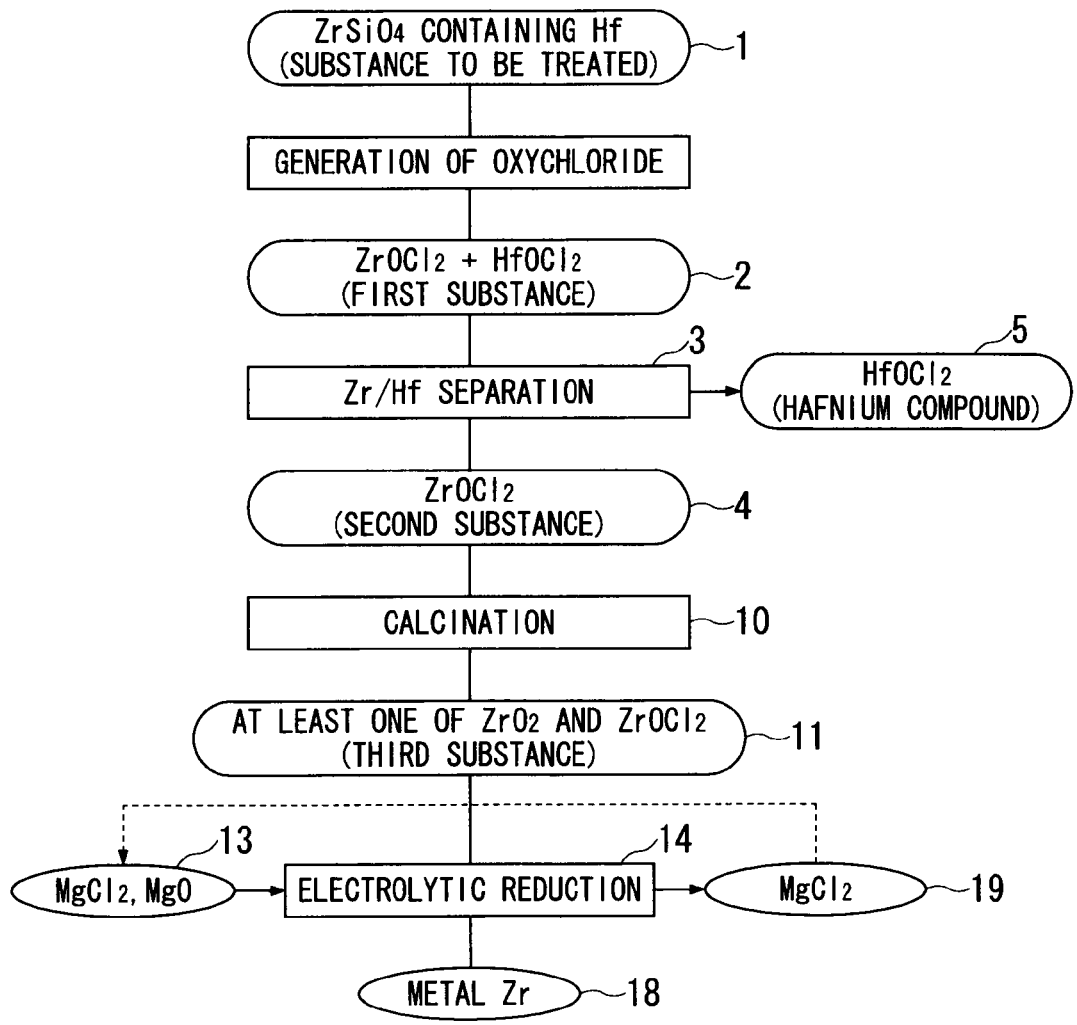
FIG. 1 is a flow chart illustrating one example of a first method of producing metal zirconium according to the present invention.

1: Zirconium ore (substance to be treated containing zirconium and hafnium)
2: Zirconium oxychloride (first substance)
3: Separation step of zirconium and hafnium
4: Purified zirconium oxychloride (second substance)
5: Separated hafnium oxychloride (hafnium compound, sixth substance)
6: Ammonium hydroxide (hydroxide)
7, 24: Hydroxide precipitation step
8: Zirconium hydroxide (fourth substance)
9: Ammonium chloride
10, 26: Calcination step
11: Substance containing at least one of zirconium oxychloride and zirconium oxide (third substance)
11A: Substance containing zirconium oxide (fifth substance)
12: Sodium sulfate
13, 20, 20A: Molten salt
14, 28: Electrolytic reduction step (direct reduction step)
18: Metal zirconium
19: Used molten salt
21: Electrolytic refining step
25: Hafnium hydroxide (eighth substance)
27: Substance containing at least one of hafnium oxychloride and hafnium oxide (seventh substance)
27A: Substance containing hafnium oxide (ninth substance)
33: Metal hafnium
51: Electrolytic bath
55: Cathode basket
56: Anode
57: Cathode

BEST MODE FOR CARRYING OUT THE INVENTION

In what follows, a method of producing metal zirconium according to the present invention will be descried with reference to the drawings.

[First Method of Producing Metal Zirconium]

A first method of producing metal zirconium according to the present invention includes a separation step, a calcination step, and a direct reduction step.

FIG. 1 is a flow chart illustrating one example of the first method of producing metal zirconium according to the present invention.

According to the first production method, an oxychloride generation step is usually conducted before the separation step.

(Oxychloride Generation Step)

The oxychloride generation step is a step of treating a substance to be treated 1 containing zirconium and hafnium to extract a first substance 2 containing a zirconium oxychloride and a hafnium oxychloride.

Examples of the substance to be treated 1 containing zirconium and hafnium include a zirconium ore containing hafnium as an impurity. Examples of the zirconium ore containing hafnium include $ZrSiO_4$ containing hafnium.

Examples of the zirconium oxychloride contained in the first substance 2 include $ZrOCl_2$. Examples of the hafnium oxychloride contained in the first substance 2 include $HfOCl_2$.

Specific examples of the oxychloride generation step include a method of treating the zirconium ore ($ZrSiO_4$) 1 containing hafnium to extract the oxychloride 2 containing a zirconium oxychloride and a hafnium oxychloride.

(Separation Step)

The separation step is a step of separating a hafnium oxychloride 5 from the first substance 2 containing a zirconium oxychloride and a hafnium oxychloride to obtain a second substance 4 having a higher content of the zirconium oxychloride.

The first substance 2 means a compound containing a zirconium oxychloride and a hafnium oxychloride. Examples of the zirconium oxychloride include $ZrOCl_2$. Examples of the hafnium oxychloride include $HfOCl_2$.

The second substance 4 means a compound having a higher content of a zirconium oxychloride than the first substance 2 by separating a hafnium oxychloride from the first substance 2, that is, a purified zirconium oxychloride. Examples of the second substance 4 include purified $ZrOCl_2$ made of $ZrOCl_2$ other than impurities.

Examples of a method of obtaining the second substance 4 by separating a hafnium oxychloride from the first substance include a method of dissolving an oxychloride (first substance) 2 containing a zirconium oxychloride and a hafnium oxychloride in hydrochloric acid and conducting an operation 3 of separating zirconium and hafnium by the use of a solvent extraction method. According to the separation operation 3, the purified zirconium oxychloride ($ZrOCl_2$) 4 as the second substance having a higher content of a zirconium oxychloride and a hafnium compound ($HfOCl_2$) 5 are separated.

(Calcination Step)

The calcination step is a step of calcining the second substance 4 to obtain a third substance 11 containing at least any of a zirconium oxychloride and a zirconium oxide.

Calcination 10 of the second substance 4 is conducted by heating for a predetermined period of time under an inert gas atmosphere. Examples of an inert gas used in the inert gas atmosphere include argon and nitrogen.

The calcination 10 removes water from the second substance 4, which then becomes the third substance 11.

The third substance 11 means a compound containing at least any of a zirconium oxychloride and a zirconium oxide.

After the second substance 4 is calcined, a calcined second substance, that is, the third substance 11 can take three forms of a zirconium oxychloride, a zirconium oxide, and a mixture of the zirconium oxychloride and the zirconium oxide depending on the degree of the calcination 10. The third substance 11 is a concept containing these three forms.

Examples of the third substance 11 include any one of $ZrO_2$ and $ZrOCl_2$ and a mixture of the two.

(Direct Reduction Step)

The direct reduction step is a step of holding the third substance 11 in a molten salt with the third substance 11 brought into contact with a cathode and applying a voltage between the cathode and an anode to directly reduce the third substance 11 to obtain metal zirconium 18.

Figure 2:
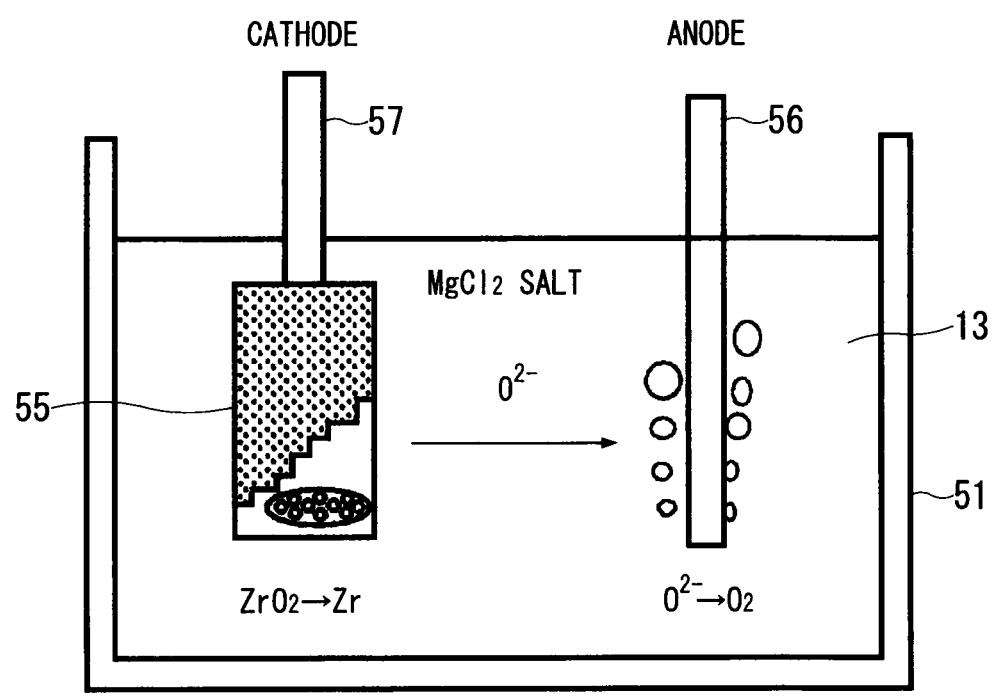
FIG. 2 is a diagram describing a direct reduction step.

FIG. 2 is a diagram describing the direct reduction step.

In the direct reduction step, the third substance 11 is held in a molten salt 13 with the third substance 11 brought into contact with a cathode 57. Examples of a method of holding the third substance 11 in the molten salt 13 with the third substance brought into contact with the cathode 57 include, as shown in FIG. 2, a method where the third substance 11 in a solid state is held in a basket 55 connected to the cathode 57, and the whole basket 55 is immersed in the molten salt 13 filling an electrolytic bath 51.

The basket 55 is a box that is made of a conductive material and has a structure where the molten salt 13 is communicable between the inside and outside of the box. Examples of the basket 55 that is used include a bottomed cylinder made of stainless having a mesh structure is used. The basket 55 is electrically connected to the cathode 57.

When the third substance 11 is held in the molten salt 13, water of the third substance 11 is substantially completely removed by depressurizing under an inert gas atmosphere. Examples of the inert gas used in the inert gas atmosphere include argon and nitrogen.

Examples of the molten salt 13 used in the direct reduction step include a molten salt containing a chloride of any of an alkali metal and an alkaline earth metal and an oxide of the same metal element as the metal element constituting the chloride.

Examples of the chloride of an alkali metal include LiCl. Examples of the chloride of an alkaline earth metal include $MgCl_2$ and $CaCl_2$. Examples of the oxide of an alkali metal include $Li_2O$. Examples of the oxide of an alkaline earth metal include MgO and CaO.

Furthermore, as the molten salt 13, it is preferable that a molten salt obtained by melting, in a molten salt of any chloride of LiCl, $MgCl_2$ and $CaCl_2$, an oxide of the same metal element as the metal element constituting the chloride is used.

Examples of the oxide of the same metal element as the metal element constituting any chloride of LiCl, $MgCl_2$ and $CaCl_2$ include $LiO_2$, MgO and CaO, respectively.

The molten salt 13 is prepared by adding and melting, to a melt of a chloride of any of an alkali metal and an alkaline earth metal, an oxide of the same metal element as the metal element constituting the chloride, for example.

In the direct reduction step, an anode 56 is immersed in the molten salt 13, a voltage is applied between the anode and the third substance 11 held in contact with the cathode 57 to conduct direct reduction 14, and thereby the third substance 11 is reduced to obtain the metal zirconium 18.

The shape of the anode 56 is not particularly limited. Examples of a material of the anode 56 that is used include platinum and graphite.

For example, as shown in FIG. 2, when the third substance 11 is held in the basket 55, the third substance 11 is reduced in the basket 55 to generate the metal zirconium 18.

At the cathode 57 in the direct reduction step, among the reaction equations of equations (1) to (3) below, the reactions of all equations, of equation (1) below only, or of equations (2) and (3) below occur, and thereby the third substance 11 in a solid state is directly reduced (14) as it is to obtain the metal zirconium 18.

[Formula 1]

$$ZrO_2 + 4e^- \rightarrow Zr + 2O^{2-} \quad (1)$$

[Formula 2]

$$ZrOCl_2 + 2e^- \rightarrow ZrO^{2-} + Cl_2 \quad (2)$$

[Formula 3]

$$ZrO^{2-} \rightarrow Zr + O^{2-} \quad (3)$$

That is, in the case where the third substance 11 is constituted only of a zirconium oxide, the reaction of equation (1) occurs to generate metal zirconium from the zirconium oxide.

Furthermore, in the case where the third substance 11 is constituted only of a zirconium oxychloride, after the reaction of equation (2) occurs to generate $ZrO^{2-}$ from the zirconium oxychloride, the reaction of equation (3) occurs to generate metal zirconium from $ZrO^{2-}$.

Furthermore, in the case where the third substance 11 contains a zirconium oxide and a zirconium oxychloride, the reactions of equations (1) to (3) occur to generate metal zirconium from the zirconium oxide and the zirconium oxychloride.

In the case where the anode 56 is made of platinum, at the anode 56 during the direct reduction step, the reaction of equation (4) below occurs to generate oxygen.

[Formula 4]

$$2O^{2-} \rightarrow O_2 + 4e^- \quad (4)$$

In the case where the anode 56 is made of graphite, in the anode 56 during the direct reduction step, the reaction of equation (5) below occurs to generate carbon dioxide.

[Formula 5]

$$C + 2O^{2-} \rightarrow CO_2 + 4e^- \quad (5)$$

The metal zirconium 18 obtained after the direct reduction step is used, for example, after formed into zircaloy, to prepare a cladding tube or a channel box for an atomic fuel.

According to the first method of producing metal zirconium, metal zirconium can be produced from a zirconium compound containing hafnium by a method having a fewer steps and a smaller amount of secondary wastes generated.

The molten salt 13 becomes a used molten salt 19 after used in the direct reduction step. For example, a molten salt 13 containing $MgCl_2$ and MgO becomes, after used in the direct reduction step, a used molten salt 19 having a higher content of $MgCl_2$ than the molten salt 13 has. The used molten salt 19 can be regenerated to a molten salt 13 by conducting a molten salt regeneration step below.

(Molten Salt Regeneration Step)

A molten salt regeneration step is a step of electrolyzing a chloride of at least one of Li, Mg and Ca present in the molten salt 19 used in the direct reduction step to regenerate at least any of metal Li, metal Mg and metal Ca.

Specifically, when, for example, a bar or a sheet-like cathode not shown in the drawing is used for electrolysis in place of the basket 55 illustrated in FIG. 2, at least one of metal Li, metal Mg and metal Ca can be attached to a surface of the cathode. The attached metal can be reused as metal Li, metal Mg and metal Ca as they are or as compounds of the metals.

In the present step, LiCl, $MgCl_2$, $CaCl_2$ or the like in the molten salt 19 is regenerated to metal Li, metal Mg, metal Ca or the like. Furthermore, metal Li, metal Mg, metal Ca or the like is regenerated to $Li_2O$, MgO, CaO or the like according to a known method. Thereby, the molten salt 19 after the direct reduction step can repeatedly be used by regenerating as the molten salt 13; accordingly, the molten salt of a chloride of an alkali metal or a chloride of an alkaline earth metal generated in the direct reduction step does not become secondary waste.

The molten salt regeneration step is a step of regenerating the molten salt used in the direct reduction step; accordingly, the molten salt regeneration step is usually conducted after the direct reduction step.

[Second Method of Producing Metal Zirconium]

A second method of producing metal zirconium according to the present invention includes a separation step, a hydroxide precipitation step, a calcination step and a direct reduction step.

Figure 3:
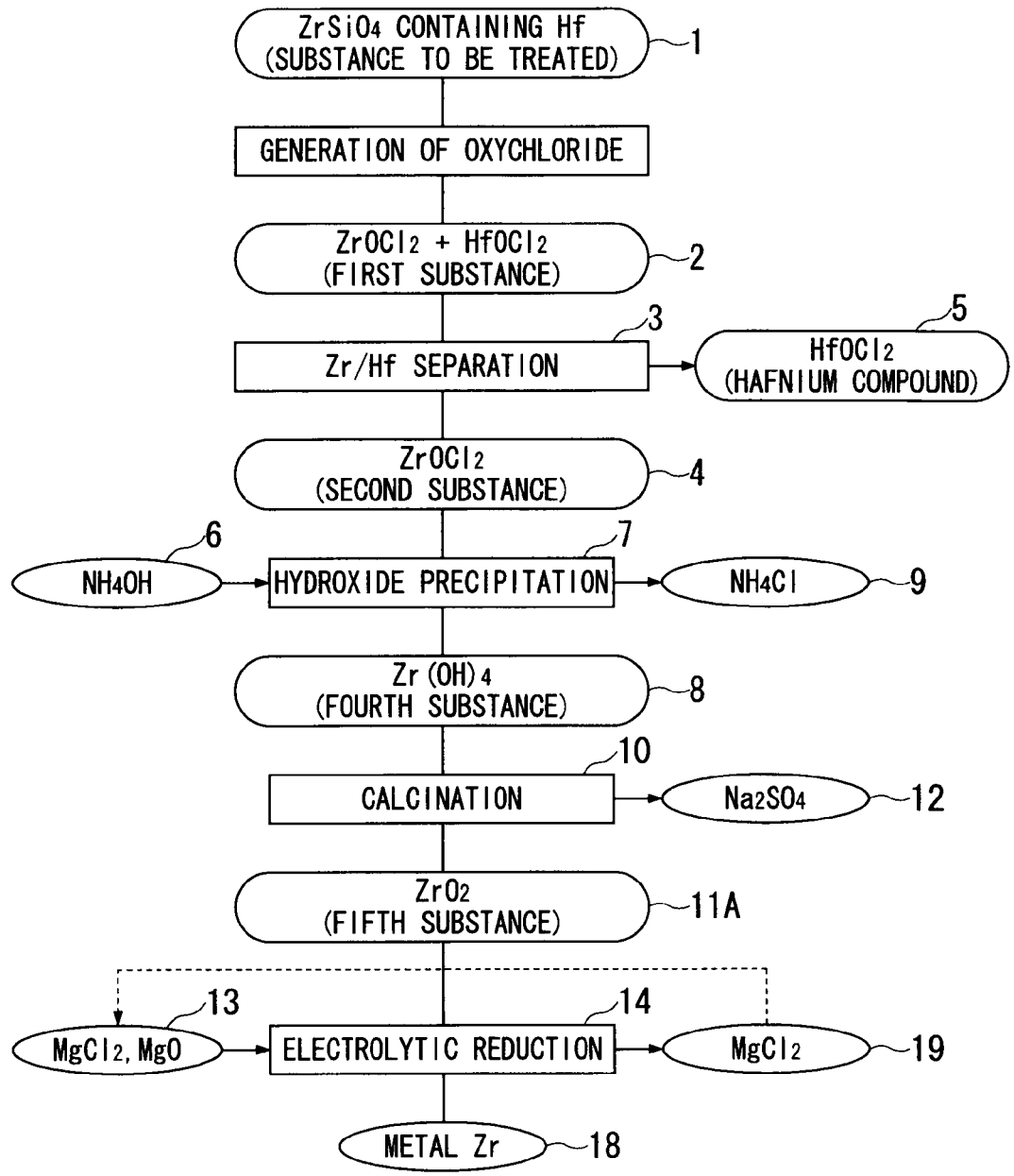
FIG. 3 is a flow chart illustrating one example of a second method of producing metal zirconium according to the present invention.

FIG. 3 is a flow chart illustrating one example of the second method of producing metal zirconium according to the present invention. In FIG. 3 where the second method of producing metal zirconium is illustrated, the same operations and substances as in FIG. 1 where the first method of producing metal zirconium is illustrated are provided with the same symbols as in FIG. 1 and descriptions thereof will be omitted or simplified.

The second method of producing metal zirconium is different from the first method of producing metal zirconium in that the hydroxide precipitation step is disposed between the separation step and the calcination step and substantially the same in the other points; accordingly, only different points will be described.

In the second method of producing metal zirconium, in a manner similar to the first method of producing metal zirconium, an oxychloride generation step as a preliminary step and the separation step are conducted to obtain a second substance 4.

In the second method of producing metal zirconium, after the separation step, the hydroxide precipitation step is conducted.

(Hydroxide Precipitation Step)

The hydroxide precipitation step is a step of obtaining a fourth substance 8 containing a zirconium hydroxide by adding a hydroxide 6 to the second substance 4.

Examples of the hydroxide 6 used in the hydroxide precipitation step 7 include ammonium hydroxide.

The fourth substance 8 means a zirconium hydroxide obtained by hydroxylating a purified zirconium oxychloride that is the second substance 4.

Examples of a method of hydroxylating the second substance 4 to obtain the fourth substance 8 containing a zirconium hydroxide include a method of adding a purified zirconium oxychloride (second substance) 4 in ammonium hydroxide ($NH_4OH$) 6 to generate a precipitate of a zirconium hydroxide (fourth substance) 8. When the ammonium hydroxide ($NH_4OH$) 6 is used, ammonium chloride ($NH_4Cl$) 9 is generated by a by-product.

(Calcination Step)

A calcination step is a step of calcining the fourth substance 8 to obtain a fifth substance 11A containing a zirconium oxide.

The conditions of calcination 10 of the fourth substance 8 are the same as the conditions of the calcination step of the first method of producing metal zirconium; accordingly, the description thereof will be omitted.

The fourth substance 8 containing a zirconium hydroxide is calcined (10) into the fifth substance 11A.

The fifth substance 11A means a zirconium oxide obtained by oxidizing a zirconium hydroxide that is the fourth substance 8.

When the fourth substance 8 is calcined (10), sodium sulfate ($Na_2SO_4$) 12 is usually generated as a by-product.

(Direct Reduction Step)

The direct reduction step is a step of holding the fifth substance 11A in a molten salt with the fifth substance 11A brought into contact with a cathode and applying a voltage between the cathode and an anode to directly reduce the fifth substance 11A to obtain metal zirconium 18.

When the direct reduction step of the second method of producing metal zirconium is compared with the direct reduction step of the first method of producing metal zirconium, both are the same except that the direct reduction step of the first method of producing metal zirconium is applied to at least one of a zirconium oxychloride and a zirconium oxide as the third substance 11 whereas the direct reduction step of the second method of producing metal zirconium is applied only to a zirconium oxide as the fifth substance 11A. Accordingly, description of the direct reduction step will be omitted.

According to the second method of producing metal zirconium, in addition to the same advantages as the first method of producing metal zirconium, an advantage is that since a target of the direct reduction in the direct reduction step is one of a zirconium oxide, the conditions of the direct reduction step are easier to control than in the first method of producing metal zirconium where a target of the direct reduction in the direct reduction step is at least one of a zirconium oxychloride and a zirconium oxide.

Also in the second method of producing metal zirconium, in the same manner as in the case of the first method of producing metal zirconium, a molten salt regeneration step can be conducted.

[Third Method of Producing Metal Zirconium]

A third method of producing metal zirconium according to the present invention includes a separation step, a calcination step and an electrolytic refining step.

Figure 4:
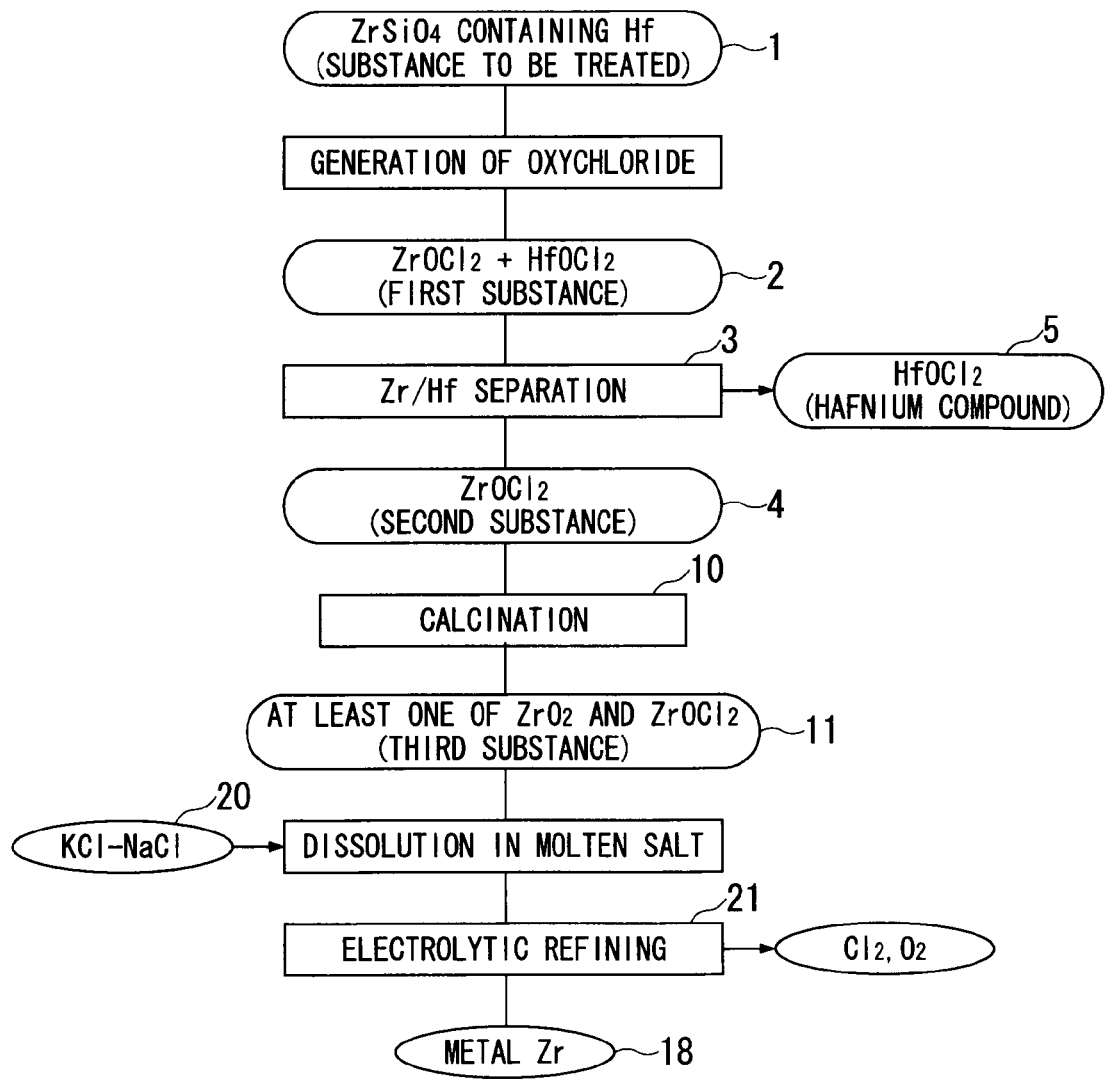
FIG. 4 is a flow chart illustrating one example of a third method of producing metal zirconium according to the present invention.
Figure 5:
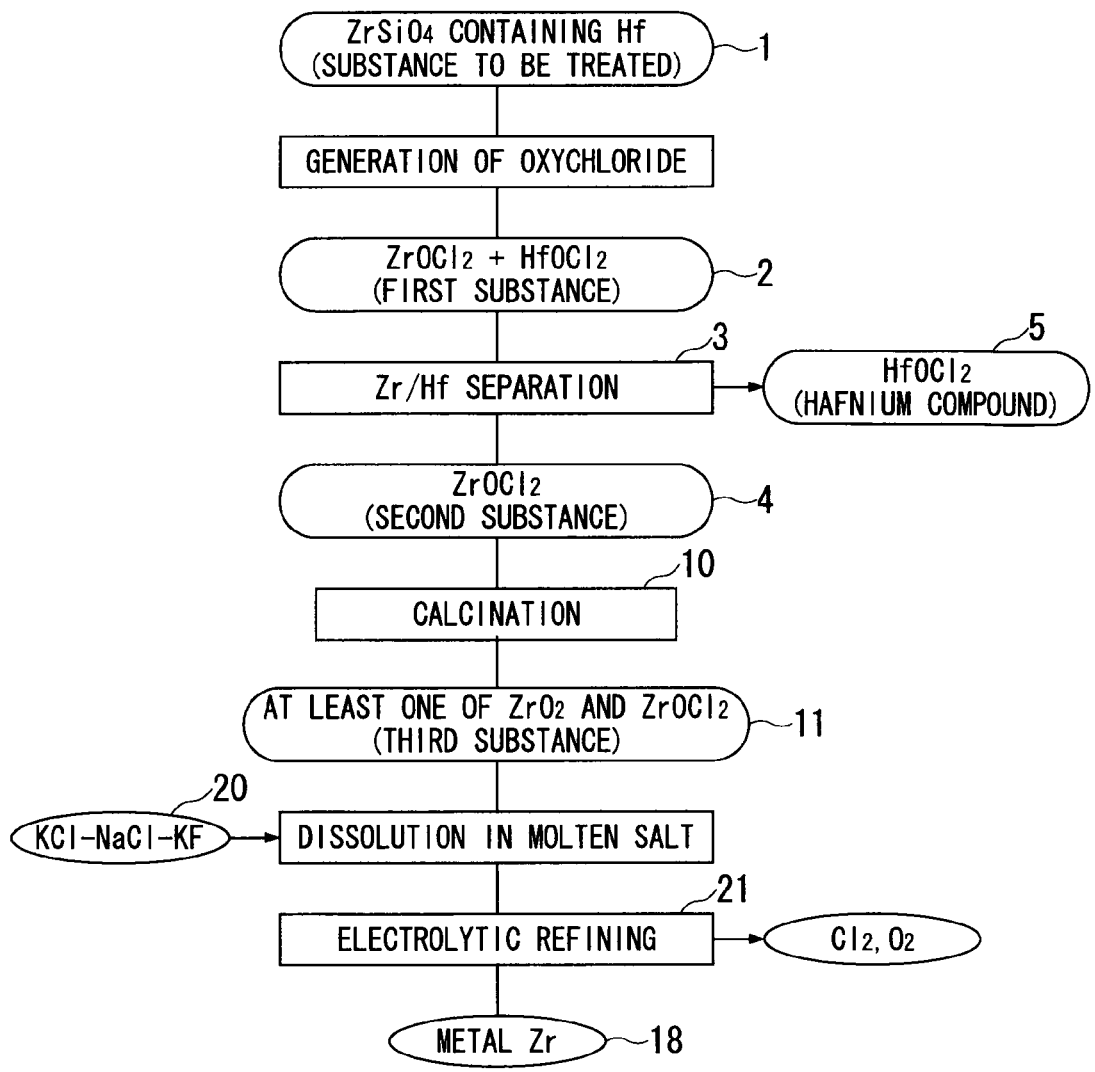
FIG. 5 is a flow chart illustrating a modification example of a third method of producing metal zirconium according to the present invention.

FIG. 4 is a flow chart illustrating one example of the third method of producing metal zirconium according to the present invention. FIG. 5 is a flow chart illustrating a modification example of the third method of producing metal zirconium according to the present invention. In FIG. 4 where the third method of producing metal zirconium is illustrated, the same operations and substances as FIG. 1 where the first method of producing metal zirconium is illustrated are provided with the same symbols as in FIG. 1 and description thereof will be omitted or simplified.

The third method of producing metal zirconium is different from the first method of producing metal zirconium in that in place of the direct reduction step, the electrolytic refining step is conducted and substantially the same as in the first method of producing metal zirconium in the other points; accordingly, only different points will be described.

In the third method of producing metal zirconium, in the same manner as in the first method of producing metal zirconium, an oxychloride generation step as a preliminary step, the separation step and the calcination step are conducted to obtain a third substance 11.

In the third method of producing metal zirconium, the electrolytic refining step is conducted after the calcination step.

(Electrolytic Refining Step)

The electrolytic refining step is a step of dissolving the third substance 11 in a molten salt and applying a voltage between a cathode and an anode immersed in the molten salt to conduct electrolytically refining the third substance to obtain metal zirconium 18.

In the electrolytic refining step 21, the third substance 11 containing at least one of a zirconium oxychloride and a zirconium oxide is dissolved in a molten salt 20 to generate a zirconium ion $Zr^{4+}$. Examples of a method of dissolving the third substance 11 in the molten salt 20 include a method where the molten salt 20 is heated to a temperature at which at least one of a zirconium oxychloride and a zirconium oxide can be melted.

Examples of the molten salt 20 used in the electrolytic refining step include a molten salt containing a chloride of any of an alkali metal and an alkaline earth metal.

Examples of the chloride of an alkali metal include LiCl, NaCl and KCl. Examples of the chloride of an alkaline earth metal include $MgCl_2$ and $CaCl_2$.

Furthermore, Examples of the molten salt 20 include molten salts of binary chlorides such as a mixed salt of a potassium chloride and a sodium chloride, a mixed salt of a potassium chloride and a lithium chloride, a mixed salt of a sodium chloride and a cesium chloride.

The molten salt 20 when a fluoride is further contained therein is preferable because tetravalent ions of zirconium are stabilized in the molten salt 20 and metal zirconium is quantitatively precipitated on the cathode. Examples of the fluoride include KF, NaF, LiF and CsF.

Specific examples of the molten salts 20 include a salt obtained by adding a potassium fluoride or a sodium fluoride to a mixed salt of a potassium chloride and a sodium chloride, a salt obtained by adding a potassium fluoride or a lithium fluoride to a mixed salt of a potassium chloride and a lithium chloride, and a salt obtained by adding a sodium fluoride or a cesium fluoride to a mixed salt of a sodium chloride and a cesium chloride.

In FIG. 5, an example where a molten salt 20A containing a fluoride is used as the molten salt 20 is shown. FIG. 5 is the same as FIG. 4 except that the molten salt 20A is used; accordingly, the same symbols are given to the same operations and substances as in FIG. 4, and description thereof will be omitted.

In the electrolytic refining step, a voltage is applied between a cathode and an anode that are not shown in the drawing and immersed in the molten salt 20 to conduct the electrolytic refining to reduce a zirconium ion $Zr^{4+}$ in the molten salt 20 to obtain metal zirconium.

The shape of the anode is not particularly limited. Examples of a material of the anode that is used include Zr.

The shape of the cathode is not particularly limited, but examples thereof include a cylinder shape, a columnar shape, and a sheet shape. Examples of a material of the cathode that is used include low carbon steel or Zr.

At the cathode during the electrolytic refining step, the reaction of equation (6) below occurs and a zirconium ion $Zr^{4+}$ is reduced to obtain metal zirconium 18.

[Formula 6]

$$Zr^{4+} + 4e^- \rightarrow Zr \quad (6)$$

At the anode during the electrolytic refining step, the reaction of equation (7) below occurs to generate a zirconium ion $Zr^{4+}$.

[Formula 7]

$$Zr \rightarrow Zr^{4+} + 4e^- \quad (7)$$

Metal zirconium 18 obtained after the electrolytic refining step is used, for example after formed into zircaloy, to prepare a cladding tube or a channel box for an atomic fuel.

According to the third method of producing metal zirconium, in addition to the same advantages as the first method of producing metal zirconium, an electrolytic refining step simpler than the direct reduction step can be used to produce metal zirconium, and the production cost can be reduced and the production time can be shortened.

According to the first to third methods of producing metal zirconium, the hafnium oxychloride 5 is separated from the first substance 2 containing a zirconium oxychloride and a hafnium oxychloride in the separation step. The first to third methods of producing metal zirconium are allowed to further include a method of producing metal hafnium by reducing the hafnium oxychloride 5 separated from the first substance 2.

Examples of the method of producing metal hafnium include methods below.

[First Method of Producing Metal Hafnium]

A first method of producing metal hafnium includes a calcination step and a direct reduction step.

Figure 6:
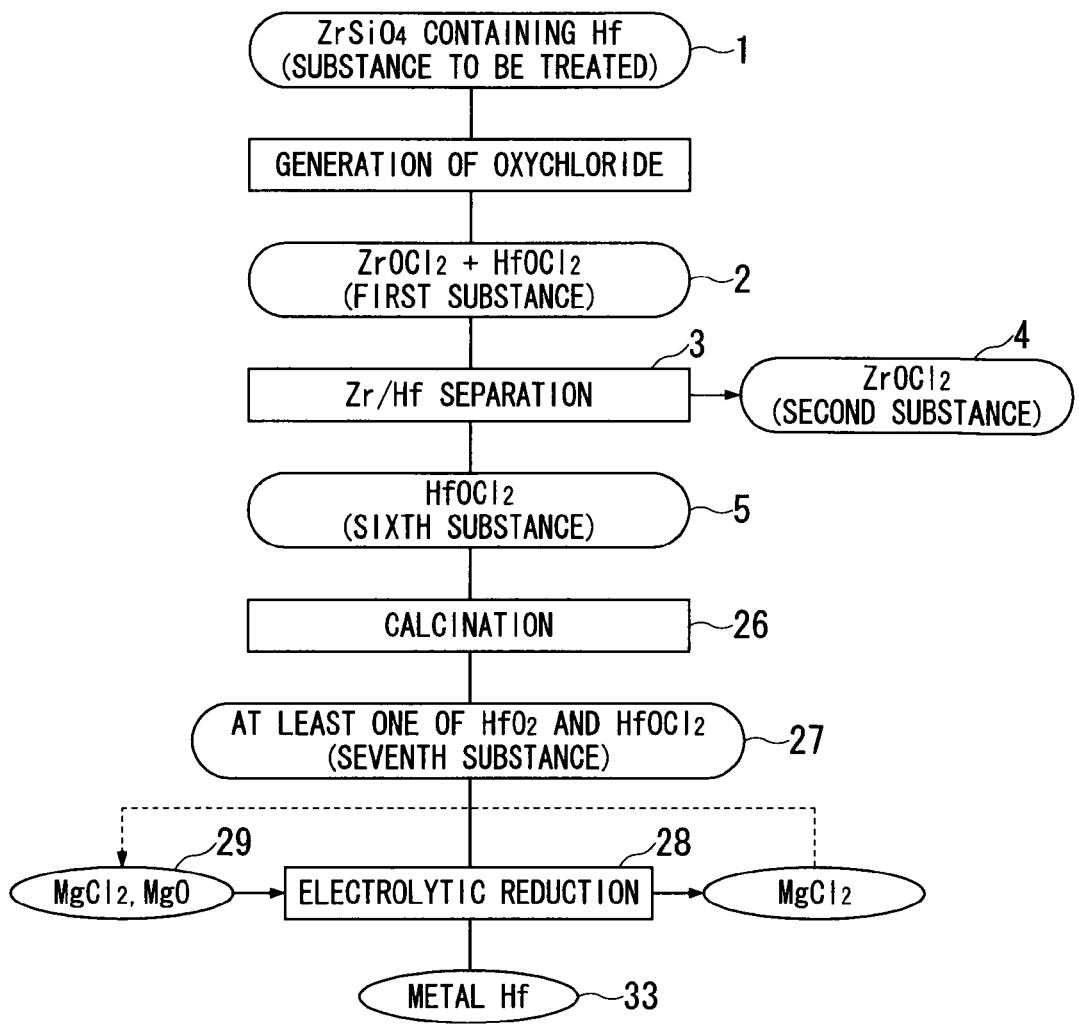
FIG. 6 is a flow chart illustrating one example of a first method of producing metal hafnium according to the present invention.

FIG. 6 is a flow chart illustrating one example of the first method of producing metal hafnium according to the present invention. In FIG. 6 where the first method of producing metal hafnium is illustrated, the same operations and substances as in FIG. 1 where the first method of producing metal zirconium is illustrated are provided with the same symbols as in FIG. 1 and description thereof will be omitted or simplified.

(Calcination Step)

The calcination step is a step of calcining a sixth substance 5 having a higher content of a hafnium oxychloride by separating from the first substance 2 in the separation step of the first to third methods of producing metal zirconium to obtain a seventh substance 27 containing at least any of a hafnium oxychloride and a hafnium oxide.

The sixth substance 5 means a compound having a higher content of a hafnium oxychloride than the first substance 2 by separating a zirconium oxychloride from the first substance 2 in the separation step of the first to third methods of producing metal zirconium, that is, a purified hafnium oxychloride. Examples of the sixth substance 5 include $HfOCl_2$.

Calcination 26 of the sixth substance 5 is conducted by heating for a predetermined period of time under an inert gas atmosphere. Examples of an inert gas used in the inert gas atmosphere include argon and nitrogen.

The sixth substance 5 becomes a seventh substance 27 by being calcined (26).

The seventh substance 27 means a compound containing at least any of a hafnium oxychloride and a hafnium oxide.

After the sixth substance 5 is calcined, a calcined sixth substance, that is, the seventh substance 27 can take three forms of a hafnium oxychloride, a hafnium oxide, and a mixture of the hafnium oxychloride and the hafnium oxide depending on the degree of the calcination 26. The seventh substance 27 is a concept containing these three forms.

Examples of the seventh substance 27 include any one of $HfO_2$ and $HfOCl_2$ or a mixture of the two.

(Direct Reduction Step)

The direct reduction step is a step of holding the seventh substance 27 in a molten salt with the seventh substance 27 brought into contact with a cathode and applying a voltage between the cathode and an anode to directly reduce the seventh substance 27 to obtain metal hafnium 33.

The direct reduction step of the first method of producing metal hafnium is the same as the direct reduction step of the first method of producing metal zirconium except that the seventh substance 27 is directly reduced in place of the third substance 11. Accordingly, descriptions of parts common in both steps will be omitted or simplified and mainly different points will be described.

In addition, in the direct reduction step of the first method of producing metal zirconium, the molten salt and the electrolytic reduction are represented by 13 and 14, respectively. However, in the present step, a molten salt and electrolytic reduction are represented by 29 and 28, respectively. The molten salt 29 used in the present step is the same as the molten salt 13 used in the direct reduction step of the first method of producing metal zirconium.

Different points between both steps are a cathode potential during the direct reduction step, a temperature during the electrolysis and a reaction equation at a cathode of the direct reduction step.

At the cathode in the present step, among the reaction equations of equations (8) to (10) below, the reactions of all equations, of equation (8) below only, or of equations (9) and (10) below occur to directly reduce the seventh substance 27 in a solid state as it is to obtain the metal hafnium 33.

[Formula 8]

$$HfO_2 + 4e^- \rightarrow Hf + 2O^{2-} \tag{8}$$

[Formula 9]

$$HfOCl_2 + 2e^- \rightarrow HfO^{2-} + Cl_2 \tag{9}$$

[Formula 10]

$$HfO^{2-} \rightarrow Hf + O^{2-} \tag{10}$$

That is, when the seventh substance 27 is made only of a hafnium oxide, the reaction of equation (8) occurs to generate metal hafnium from a hafnium oxide.

Furthermore, when the seventh substance 27 is made only of a hafnium oxychloride, after the reaction of equation (9) occurs to generate $HfO^{2-}$ from the hafnium oxychloride, the reaction of equation (10) occurs to generate metal hafnium from $HfO^{2-}$.

Furthermore, when the seventh substance 27 contains a hafnium oxide and a hafnium oxychloride, the reactions of equations (8) to (10) occur to generate metal hafnium from the hafnium oxide and the hafnium oxychloride.

In the case where an anode is made of platinum, at the anode of the present step, in the same manner as in the direct reduction step of the first method of producing metal zirconium, the reaction of equation (4) above occurs to generate oxygen.

In the case where an anode is made of graphite, at the anode of the present step, in the same manner as in the direct reduction step of the first method of producing metal zirconium, the reaction of equation (5) above occurs to generate carbon dioxide.

The metal hafnium 33 obtained after the direct reduction step is used as, for example, a material of a control rod and a semiconductor.

According to the method of producing metal zirconium in which the first to third methods of producing metal zirconium are combined with the first method of producing metal hafnium, in addition to advantages of the first to third production methods of metal zirconium, metal hafnium can be produced by a method having a fewer steps and a smaller amount of secondary wastes generated.

[Second Method of Producing Metal Hafnium]

A second method of producing metal hafnium includes a hydroxide precipitation step, a calcination step and a direct reduction step.

Figure 7:
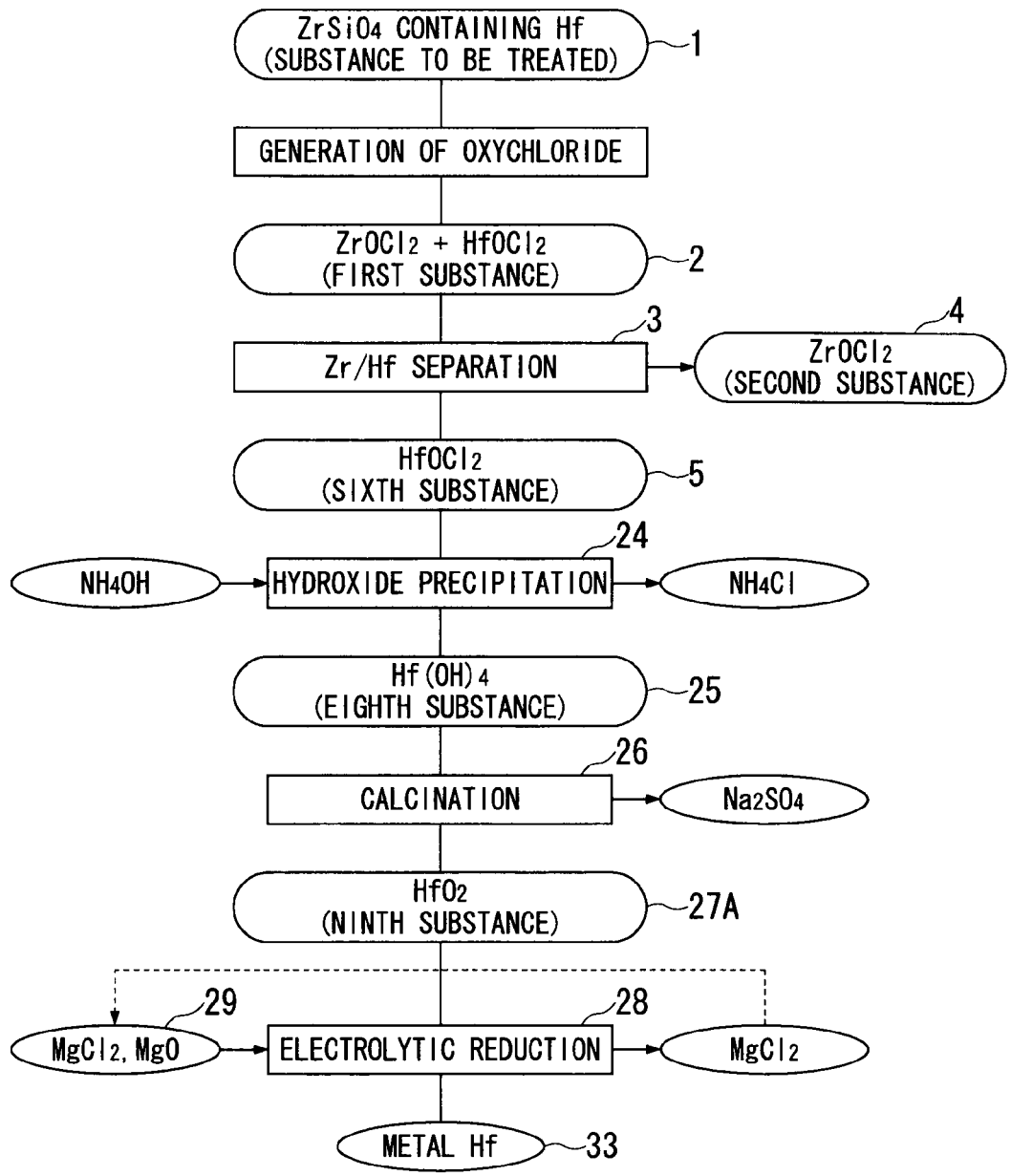
FIG. 7 is a flow chart illustrating one example of a second method of producing metal hafnium according to the present invention.

FIG. 7 is a flow chart illustrating an example of the second method of producing metal hafnium according to the present invention. In FIG. 7 where the second method of producing metal hafnium is illustrated, the same operations and substances as in FIG. 6 where the first method of producing metal hafnium is illustrated are provided with the same symbols as in FIG. 6 and descriptions thereof will be omitted or simplified.

The second method of producing metal hafnium is substantially the same as the first method of producing metal hafnium except that a hydroxide precipitation step is disposed between the separation step and the calcination step; accordingly, only different points will be described.

In the second method of producing metal hafnium, in the same manner as in the first method of producing metal hafnium, a separation step is conducted to obtain a seventh substance 27.

In the second method of producing metal hafnium, a hydroxide precipitation step is conducted after the separation step.

(Hydroxide Precipitation Step)

The hydroxide precipitation step is a step of adding a hydroxide to the sixth substance 5 having a higher content of a hafnium oxychloride by separating from the first substance 2 in the separation steps of the first to third methods of producing metal zirconium to obtain an eighth substance 25 containing a hafnium hydroxide.

Examples of the hydroxide used in the hydroxide precipitation step include an ammonium hydroxide.

The eighth substance 25 means a hafnium hydroxide obtained by hydroxylating a purified hafnium oxychloride that is the sixth substance 5.

Examples of methods of obtaining the eighth substance 25 containing a hafnium hydroxide by hydroxylating the sixth substance 5 include a method of adding the purified hafnium oxychloride (sixth substance) 5 to ammonium hydroxide ($NH_4OH$) to precipitate the hafnium hydroxide (eighth substance) 25. When ammonium hydroxide ($NH_4OH$) is used, ammonium chloride ($NH_4Cl$) is generated as a by-product.

(Calcination Step)

The calcination step is a step of obtaining a ninth substance 27A containing a hafnium oxide by calcining the eighth substance 25.

The conditions of calcination 10 of the eighth substance 25 are the same as the conditions of the first method of producing metal hafnium; accordingly, descriptions thereof will be omitted.

The eighth substance 25 containing a hafnium hydroxide is converted to the ninth substance 27A by calcining 26.

The ninth substance 27A means a hafnium oxide obtained by oxidizing a hafnium hydroxide that is the eighth substance 25.

(Direct Reduction Step)

The direct reduction step is a step of holding the ninth substance 27A in a molten salt with the ninth substance 27A brought into contact with a cathode and applying a voltage between the cathode and an anode to directly reduce the ninth substance to obtain metal hafnium 33.

The direct reduction step of the second method of producing metal hafnium is the same as the direct reduction step of the first method of producing metal hafnium except that the direct reduction step of the first method of producing metal hafnium is conducted to at least one of a hafnium oxychloride and a hafnium oxide as the seventh substance 27 whereas the direct reduction step of the second method of producing metal hafnium is conducted only to a hafnium oxide as the ninth substance 27A. Accordingly, description of the direct reduction step will be omitted.

According to the method of producing metal zirconium in which the first to third methods of producing metal zirconium are combined with the second method of producing metal hafnium, the same advantages as the methods of producing metal zirconium where the first to third methods of producing metal zirconium are combined with the first method of producing metal hafnium are obtained.

Furthermore, according to the method of producing metal zirconium in which the first to third methods of producing metal zirconium are combined with the second method of producing metal hafnium, since a target of the direct reduction in the direct reduction step is one of a hafnium oxide, the conditions of the direct reduction step are easier to control than the method of producing metal zirconium where the first to third methods of producing metal zirconium are combined with the first method of producing metal hafnium.

Also in the second method of producing metal hafnium, a molten salt regeneration step can be conducted in the same manner as in the case of the first method of producing metal hafnium and metal zirconium.

EXAMPLES

In what follows, Examples will be shown. However, the present invention is not construed as limited thereto.

Example 1

Metal zirconium was produced according to a procedure illustrated in FIG. 1.
(Oxychloride Generation Step)
Oxychloride ($ZrOCl_2$) 2 abundant in zirconium was extracted by treating a zirconium ore ($ZrSiO_4$) 1. The oxychloride ($ZrOCl_2$) 2 contained a hafnium compound as an impurity.
(Separation Step)
The zirconium oxychloride ($ZrOCl_2$) 2 was dissolved in hydrochloric acid, and a zirconium compound ($ZrOCl_2$) 4 and a hafnium compound ($HfOCl_2$) 5 were separated according to a separation step 3 that used a solvent extraction method. The separated zirconium compound ($ZrOCl_2$) 4 and hafnium compound ($HfOCl_2$) 5 were each recovered.
(Calcination Step)
When the purified zirconium oxychloride ($ZrOCl_2$) 4 was calcined in a calcination step 10 under an argon gas atmosphere, at a predetermined temperature and for a predetermined period of time, water was removed, and thereby a $ZrOCl_2$—$ZrO_2$ mixture 11 was generated.
(Direct Reduction Step)
An apparatus illustrated in FIG. 2 was used. Under an argon gas atmosphere, an electrolytic bath 51 was filled with a molten salt 13 obtained by dissolving magnesium oxide MgO in a molten magnesium chloride $MgCl_2$. The molten salt 13 was stirred by bubbles of an argon gas.

Next, the $ZrOCl_2$—$ZrO_2$ mixture 11 was placed in a stainless mesh bottomed cylindrical basket 55 illustrated in FIG. 2, and the entire basket 55 was immersed in the molten salt 13. The molten salt 13 rapidly intruded into the basket 55 through a meshed wall surface of the basket 55 and the inside of the basket 55 was filled with the molten salt 13.

Furthermore, after a platinum rod anode 17 was immersed in the molten salt 13 outside of the basket 55, the basket 55 was connected to a cathode 16, and a voltage was applied between the anode 17 and the cathode 16.

When the voltage continued to be applied in this state and then the basket 55 was pulled up from the molten salt 13, metal zirconium 18 was obtained inside of the basket 55. A molten salt 19 after the end of electrolytic reduction 14 had a higher concentration of $MgCl_2$ and a lower concentration of MgO than before the start of the electrolytic reduction.
(Molten Salt Regeneration Step)
After the direct reduction step, a platinum rod cathode not shown in the drawing was immersed in the molten salt 19 containing $MgCl_2$ and MgO, and a voltage was applied between the cathode and the anode 17. The applied voltage was controlled so that the potential and the current density of the platinum rod cathode became predetermined values.

When the voltage continued to be applied in this state and then the platinum rod cathode was pulled up from the molten salt 19, metal magnesium was found to precipitate on a surface of the platinum rod cathode.

The resulting metal magnesium was treated to generate MgO, which was then reused as a raw material of the molten salt 13 used in the subsequent direct reduction step.

Although ammonium chloride $NH_4Cl$ became a process waste (secondary waste) according to the conventional reduction method, in the present Example, $NH_4Cl$ was not generated; accordingly, the process waste of $NH_4Cl$ was not generated.

Furthermore, conventionally, the molten salt 13 having a higher content of $MgCl_2$ in the direct reduction step became a process waste. However, in the present example, reuse of the molten salt 13 was allowed by the molten salt regeneration step; accordingly, the process waste of $MgCl_2$ became less.

Comparative Example 1

Figure 8:
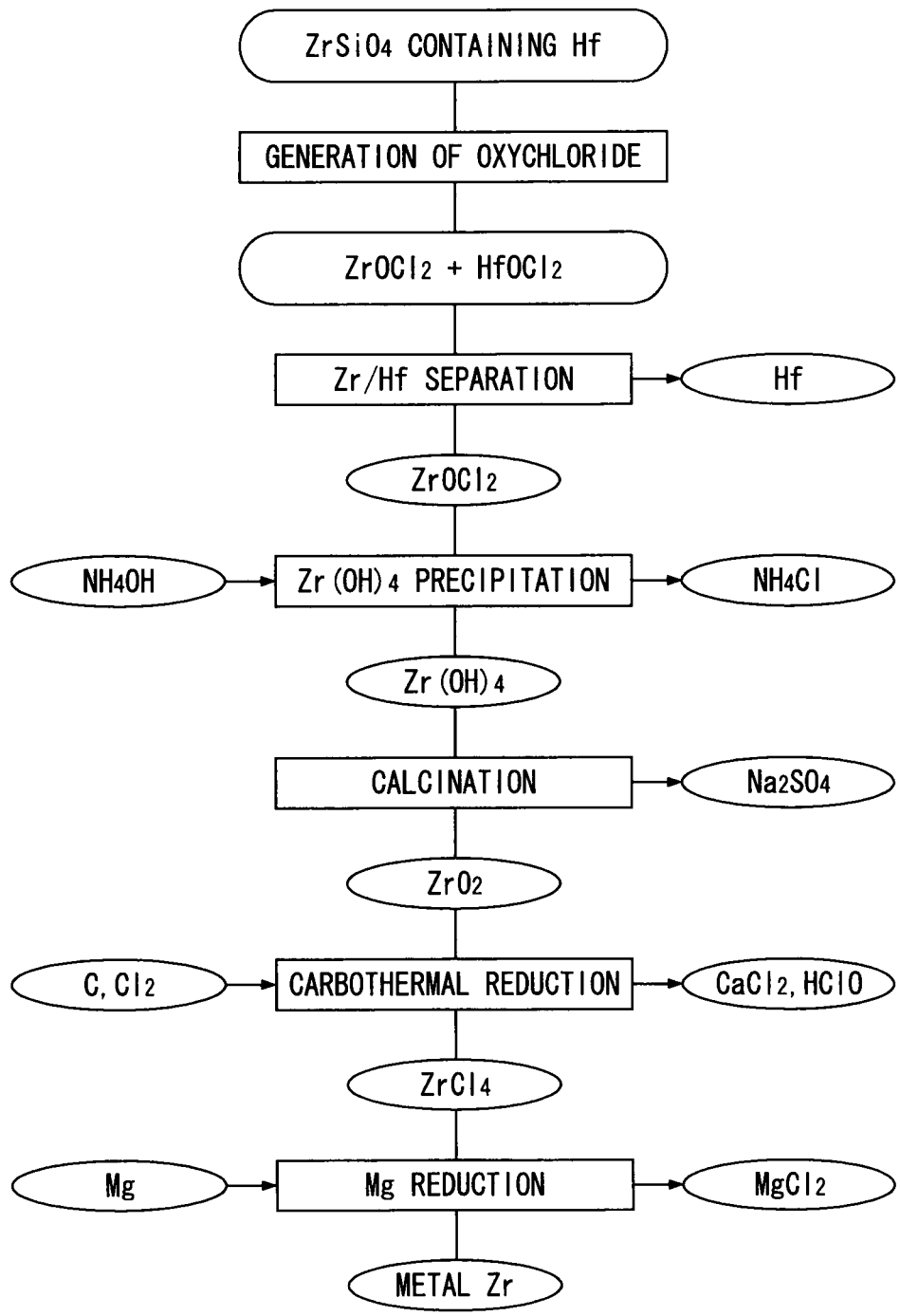
FIG. 8 is a flow chart illustrating a method of producing metal zirconium of Comparative Example 1.

Metal zirconium was produced according to a procedure illustrated in FIG. 8.

An oxychloride generation step was conducted in the same manner as in Example 1, and thereby an oxychloride ($ZrOCl_2$) 2 abundant in zirconium was extracted from a zirconium ore ($ZrSiO_4$) 1.
(Separation Step)
The zirconium oxychloride ($ZrOCl_2$) 2 was dissolved in hydrochloric acid, and a zirconium compound ($ZrOCl_2$) 4 and a hafnium compound were separated according to a separation step 3 that used a solvent extraction method. The separated zirconium compound ($ZrOCl_2$) 4 and hafnium compound were each recovered.
(Hydroxide Precipitation Step)
When the zirconium compound ($ZrOCl_2$) 4 was dissolved in aqueous ammonia ($NH_4OH$), $Zr(OH)_2$ was precipitated. Ammonium chloride ($NH_4Cl$) 9 generated as a by-product in the step became waste.
(Calcination Step)
When $Zr(OH)_2$ was dried, followed by calcining under an argon gas atmosphere, at a predetermined temperature and for a predetermined period of time in the calcination step, water was removed, and thereby a zirconium oxide ($ZrO_2$) was generated.
(Carbon Reduction Method)
When under a flow of $Cl_2$, a mixture of $ZrO_2$ and graphite was subjected to carbothermal reduction, a zirconium chloride ($ZrCl_4$) was generated.
(Mg Reduction Method)
When metal Mg and a zirconium chloride ($ZrCl_4$) were allowed to react according to a Kroll process in an argon gas, metal zirconium was obtained.

In the present Comparative Example, $NH_4Cl$ became a process waste in the hydroxide precipitation step.

In the present Comparative Example, $MgCl_2$ generated in the Mg reduction step became a process waste.

Example 2

Metal zirconium was produced according to a procedure illustrated in FIG. 4.

Firstly, an oxychloride generation step, a separation step and a calcination step were conducted in the same manner as in Example 1, and thereby a $ZrOCl_2$—$ZrO_2$ mixture 11 was obtained. The content of the zirconium oxychloride ($ZrOCl_2$) and the content of zirconium oxide ($ZrO_2$) in the $ZrOCl_2$—$ZrO_2$ mixture 11 were the same as in Example 1.

(Electrolytic Refining Step)

Under an argon gas atmosphere, an electrolytic bath 51A was filled with molten salt 20 obtained by dissolving potassium chloride and sodium chloride. The molten salt 20 was stirred by bubbles of an argon gas.

Next, the $ZrOCl_2$—$ZrO_2$ mixture 11 was melted in the molten salt 20.

Furthermore, a platinum rod anode and a zirconium rod cathode were immersed in the molten salt 20 and a voltage was applied between the anode and the cathode to conduct electrolytic refining 21.

When the voltage continued to be applied in this state and then the cathode was pulled up from the molten salt 20, metal zirconium 18 was precipitated on a surface of the cathode.

(Molten Salt Regeneration Step)

After the electrolytic refining step, a platinum rod cathode not shown in the drawing was immersed in a molten salt 13 containing $MgCl_2$ and MgO, followed by applying a voltage between the cathode and an anode 17. The applied voltage was controlled so that the potential and the current density of the platinum rod cathode became predetermined values.

When the voltage continued to be applied in this state and then the platinum rod cathode was pulled up from the molten salt 13, metal magnesium was precipitated on a surface of the platinum rod cathode.

The resulting metal magnesium was treated to generate MgO, which was then reused as a raw material of the molten salt 13 used in the subsequent electrolytic refining step.

In the present Example, $NH_4Cl$ became a process waste in the hydroxide precipitation step.

In the present Example, reuse of the molten salt 13 was allowed by the molten salt regeneration step; accordingly, the process waste of $MgCl_2$ became less.

The amount of the process waste in each of Examples 1, 2 and Comparative Example 1 is as follows.

That is, when the weight of the process wastes of all steps of Comparative Example 1 where $NH_4Cl$ and $MgCl_2$ became process wastes was assigned to 100, the weight of the process wastes of all steps of Example 1 where $NH_4Cl$ was not generated and the amount of the process waste of $MgCl_2$ was less was 20.

Furthermore, when the weight of the process wastes of all steps of Comparative Example 1 was assigned to 100, the weight of the process wastes of all steps of Example 2 where $NH_4Cl$ was generated but the amount of the process waste of $MgCl_2$ was less was 60.

Example 3

Metal hafnium was produced according to a procedure illustrated in FIG. 6.

Firstly, an oxychloride generation step and a separation step were conducted in the same manner as in Example 1, and thereby a zirconium compound ($ZrOCl_2$) 4 and a hafnium compound ($HfOCl_2$) 5 were separated. The separated zirconium compound ($ZrOCl_2$) 4 and hafnium compound ($HfOCl_2$) 5 were each recovered.

(Calcination Step)

When the purified hafnium compound ($HfOCl_2$) 5 was calcined in a calcination step 26 under an argon gas atmosphere, water was removed and thereby a $HfOCl_2$—$HfO_2$ mixture 27 was generated.

(Direct Reduction Step)

An apparatus illustrated in FIG. 2 was used. Under an argon gas atmosphere, an electrolytic bath 51 was filled with a molten salt 29 at 850° C. obtained by dissolving magnesium oxide MgO in a molten magnesium chloride $MgCl_2$. The molten salt 29 was stirred by bubbles of an argon gas.

Next, the $HfOCl_2$—$HfO_2$ mixture 27 was placed in a stainless mesh bottomed cylindrical basket 55 illustrated in FIG. 2, and the entire basket 55 was immersed in the molten salt 29. The molten salt 29 rapidly intruded into the basket 55 through a mesh wall surface of the basket 55 and the inside of the basket 55 was filled with the molten salt 29.

Furthermore, after a platinum rod anode 17 was immersed in the molten salt 29 outside of the basket 55, the basket 55 was connected to a cathode 16, and a voltage was applied between the anode 17 and the cathode 16. The applied voltage was controlled so that the potential and the current density of the cathode 16 became predetermined values.

When the voltage continued to be applied in this state and then the basket 55 was pulled up from the molten salt 29, metal hafnium 33 was obtained inside of the basket 55.

INDUSTRIAL APPLICABILITY

According to a method of producing metal zirconium according to the present invention, metal zirconium can be produced from a zirconium compound containing hafnium by a method having a fewer steps and a smaller amount of secondary wastes generated.

The invention claimed is:

1. A method of producing zirconium metal and hafnium metal, comprising:
   a separation step of separating a hafnium oxychloride from a first substance containing a zirconium oxychloride and a hafnium oxychloride to obtain a second substance having a higher content of the zirconium oxychloride;
   a calcination step of calcining the second substance in an inert gas atmosphere to remove a moisture content and to obtain a third substance containing at least one of a zirconium oxychloride or a zirconium oxide;
   a direct reduction step of holding the third substance in a molten salt with the third substance brought into contact with a cathode and applying a voltage between the cathode and an anode to directly reduce the third substance as it is to obtain zirconium metal;
   a calcination step of calcining a sixth substance under an inert gas atmosphere, the sixth substance being separated from the first substance in the separation step and having a higher content of the hafnium oxychloride to obtain a seventh substance containing at least one of a hafnium oxychloride or a hafnium oxide; and
   a direct reduction step of holding the seventh substance in a molten salt with the seventh substance brought into contact with a cathode and applying a voltage between the cathode and an anode to directly reduce the seventh substance as it is to obtain hafnium metal;
   wherein said method does not comprise carbothermal reduction of $ZrO_2$ to $ZrCl_4$.

2. The method of producing zirconium metal and hafnium metal according to claim 1, wherein in the direct reduction step, the third substance is held in a solid state in a basket connected to the cathode and is directly reduced as in a solid state.

3. The method of producing zirconium metal and hafnium metal according to claim 1, wherein the molten salt contains a chloride of any of an alkali metal and an alkaline earth metal and an oxide of the same metal element as the metal element constituting the chloride.

4. The method of producing zirconium metal and hafnium metal according to claim 3, wherein the molten salt is a molten salt obtained by melting, in a molten salt of any chloride of LiCl, $MgCl_2$ and $CaCl_2$, an oxide of the same metal element as the metal element constituting the chloride.

5. The method of producing zirconium metal and hafnium metal according to claim 4, further comprising a molten salt regeneration step of electrolyzing a chloride of at least any of Li, Mg and Ca present in the molten salt used in the direct reduction step to regenerate at least one of Li metal, Mg metal or Ca metal.

6. The method of producing zirconium metal and hafnium metal according to claim 1, wherein in the direct reduction step, the seventh substance is held in a solid state in a basket connected to the cathode and is directly reduced as in a solid state.

7. The method of producing zirconium metal and hafnium metal according to claim 1, wherein the molten salt contains a chloride of at least one of an alkali metal, an alkaline earth metal, or an oxide of the same metal element as the metal element constituting the chloride.

8. The method of producing zirconium metal and hafnium metal according to claim 7, wherein the molten salt comprises at least one of LiCl, $MgCl_2$ or $CaCl_2$, or at least one of $Li_2O$, MgO or CaO.

9. A method of producing zirconium metal and hafnium metal comprising:
(A) a separation step of separating a hafnium oxychloride from a first substance containing a zirconium oxychloride and a hafnium oxychloride and recovering a second substance having a higher content of the zirconium oxychloride and lower content of hafnium oxychloride than said first substance;
a calcination step of calcining the second substance in an inert gas atmosphere to remove a moisture content and to obtain a third substance containing at least one of a zirconium oxychloride and a zirconium oxide;
a direct reduction step of holding the third substance in a molten salt with the third substance brought into contact with a cathode and applying a voltage between the cathode and an anode to directly reduce the third substance as it is to obtain zirconium metal; and
(B) a separation step of separating a zirconium oxychloride from a first substance containing a zirconium oxychloride and a hafnium oxychloride to obtain and recovering a sixth substance having a higher content of the hafnium oxychloride and lower content of zirconium oxychloride than said first substance;
a hydroxide precipitation step of adding a hydroxide to a sixth substance to obtain an eighth substance containing a hafnium hydroxide;
a calcination step of calcining the eighth substance in an inert as atmosphere to obtain a ninth substance containing a hafnium oxide; and
a direct reduction step of holding the ninth substance in a molten salt with the ninth substance brought into contact with a cathode and applying a voltage between the cathode and an anode to directly reduce the ninth substance as it is to obtain metal hafnium;
wherein said method does not comprise carbothermal reduction of $ZrO_2$ to $ZrCl_4$.

10. The method of claim 9, further comprising extracting $ZrSiO_4$-containing ore that also contains hafnium to generate zirconium and hafnium oxychlorides prior to the separation step.

11. The method of claim 1, further comprising extracting $ZrSiO_4$-containing ore that also contains hafnium to generate zirconium and hafnium oxychlorides prior to the separation step.

12. The method of claim 1, wherein an amount of chloride-containing secondary wastes is reduced compared to an otherwise similar method that employs chlorination-volatilization or that employs the Kroll process to produce zirconium metal and hafnium metal.

* * * * *